United States Patent [19]
Kikuchi et al.

[11] Patent Number: 6,041,190
[45] Date of Patent: Mar. 21, 2000

[54] IMAGE DISPLAY APPARATUS

[75] Inventors: Hiroshi Kikuchi, Zushi; Takayuki Tsuboi, Yokohama, both of Japan

[73] Assignee: Canon Kabushiki Kaisha, Tokyo, Japan

[21] Appl. No.: 08/866,860

[22] Filed: May 30, 1997

[30] Foreign Application Priority Data

Jun. 4, 1996 [JP] Japan ................................. 8-162453

[51] Int. Cl.⁷ ............................ G03B 21/00; G02B 27/02
[52] U.S. Cl. ......................... 396/284; 396/287; 396/430; 353/26 R; 353/DIG. 2; 40/361
[58] Field of Search .................................. 396/287, 430, 396/284; 40/361, 364, 362, 365, 366, 367; 353/DIG. 2, 26 R; 355/75, 21, 40

[56] References Cited

U.S. PATENT DOCUMENTS

| | | | |
|---|---|---|---|
| 5,164,751 | 11/1992 | Weyer ..................................... | 396/430 |
| 5,521,662 | 5/1996 | Suzuki ................................... | 40/367 X |
| 5,618,093 | 4/1997 | Merle et al. .......................... | 353/26 R |
| 5,677,759 | 10/1997 | Tanimoto et al. ..................... | 355/75 |
| 5,692,818 | 12/1997 | Kitagawa .............................. | 353/26 R |
| 5,835,173 | 11/1998 | Inbar et al. ........................... | 40/361 X |
| 5,946,507 | 8/1999 | Akami et al. .......................... | 396/287 |

*Primary Examiner*—W. B. Perkey
*Attorney, Agent, or Firm*—Robin, Blecker & Daley

[57] ABSTRACT

An image display apparatus for displaying an image recorded on a film, includes a spatial light modulation device which can maintain a recorded image in a non-energization state, an illumination device for illuminating the spatial light modulation device with light, a switching mechanism for switching between a first state in which the film is located between the spatial light modulation device and the illumination device and a second state in which the film is not located between the spatial light modulation device and the illumination device, and a control circuit for activating the spatial light modulation device and the illumination device in the first state when an image recorded on the film is to be recorded on the spatial light modulation device, and activating the illumination device in the second state when the spatial light modulation device on which the image is recorded is to be observed.

26 Claims, 8 Drawing Sheets

IMAGE DISPLAY APPARATUS

BACKGROUND OF THE INVENTION

1. Field of the Invention

The present invention relates to an apparatus used for visually observing or checking a negative/positive film or the like of a silver chloride camera.

2. Related Background Art

Conventionally, as for this type of apparatus, it was a common practice to set a light box prepared by covering a fluorescent lamp by a semiopaque glass plate under a film, and to observe an image using a magnifier for magnifying an image. However, upon observation of, especially, a negative film using such apparatus, only a person who is accustomed to such operation of observing a negative image, i.e., only a skilled person, could identify persons on the film.

The present inventor has proposed and filed a look-in type viewer before the present application. However, the invention had the following problems that remain unsolved. That is, as a memory system or display using an SLM (Spatial Light Modulation) element like in the application, Japanese Patent Application No. 08-003935 or the like is known. In a system described in this invention, writing or reading light was split into three color light components using, e.g., a dichroic mirror, and the split color light components are recorded, or the light is split into three color light components time-serially and the three color light components are caused to flicker at a speed that cannot be sensed by the eyes of a human being, thereby writing/reading data to display an image.

However, especially, the conventional display has the following problems to be solved. In order to time-serially turn on three color light components, i.e., to sequentially turn on three color light components at about 60 Hz, a light source which can flicker at a speed of about 200 Hz for the ON cycles of the individual color components is required. As a light source which can attain such high-speed flickering and has durability, only LEDs are available. However, since an LED has a limited luminance as a light source, it is applicable only to a look-in type product like a finder of a camera described in the above prior art. Such product is unsatisfactory as a negative/positive viewer (of course, many users want to appreciate an image like an electronic album or to observe an image magnified using an optical system).

SUMMARY OF THE INVENTION

One aspect of the invention is to provide an image display apparatus which has a spatial light modulation device which can maintain a recorded image in a non-energization state, and an illumination device which illuminates the spatial light modulation device with light, comprising a switching mechanism for switching between a first state in which a film is located between the spatial light modulation device and the illumination device, and a second state in which the film is not located between the spatial light modulation device and the illumination device, and a control circuit for activating the spatial light modulation device and the illumination device in the first state when an image recorded on the film is to be recorded on the spatial light modulation device, and activating the illumination device in the second state when the spatial light modulation device on which the image is recorded is to be observed, whereby the film never shields light for the illumination device upon observation of the spatial light modulation device on which the image is recorded.

The other aspect of this invention is to provide an image display apparatus which has an illumination device for illuminating the spatial light modulation device on which an image recorded on the film is recorded upon observation of the spatial light modulation device on which the image is recorded, wherein the illumination device illuminates the spatial light modulation device with light in the same illumination direction as that of light upon recording the image recorded on the film on the spatial light modulation device, whereby the illumination device need only be laid out on only one surface side of the spatial light modulation device.

BRIEF DESCRIPTION OF THE DRAWINGS

FIG. 6 which is composed of FIGS. 6A and 6B are operation flow charts in an image display apparatus according to the third embodiment of the present invention.

DESCRIPTION OF THE PREFERRED EMBODIMENTS

Figure 1A:
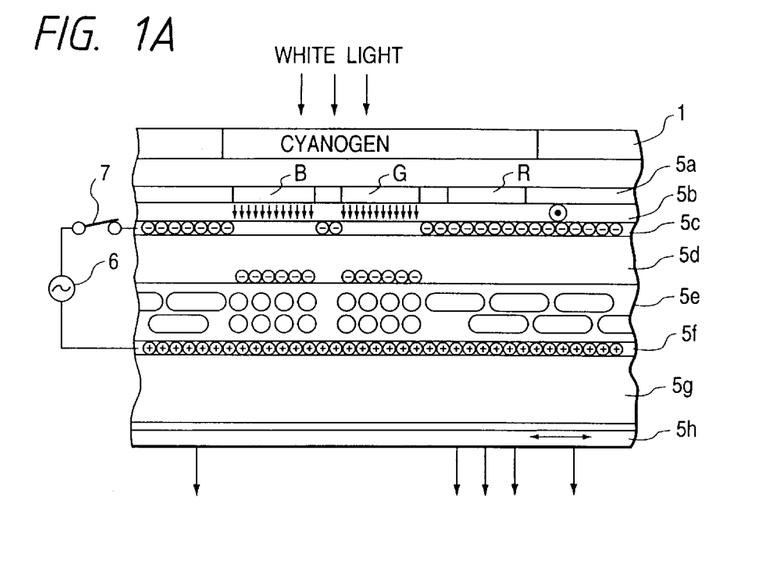
FIGS. 1A and 1B are sectional views showing an SLM element which is applied to an image display apparatus of the present invention to explain a case wherein a negative image is to be inverted to a positive image.
Figure 1B:
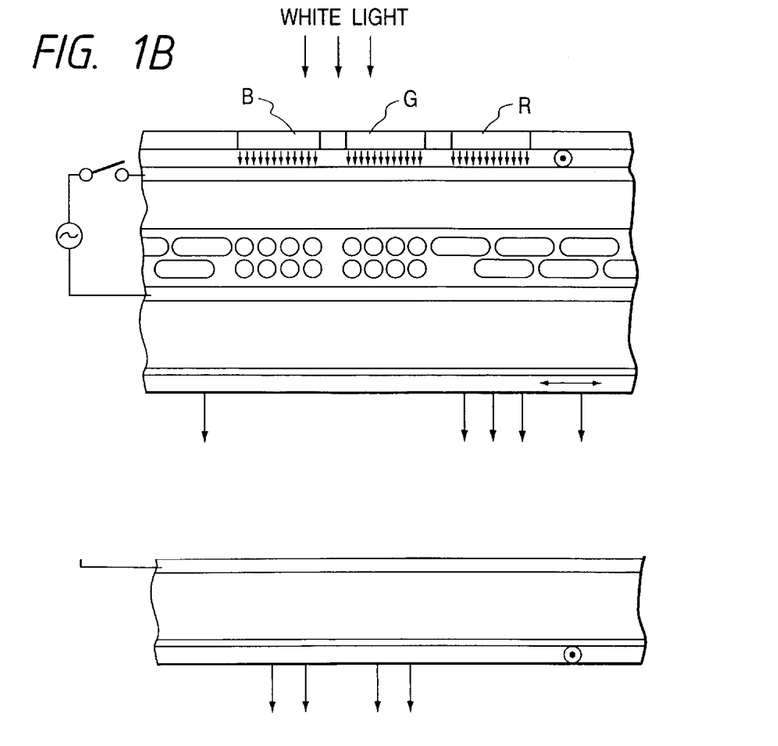
Figure 2A:
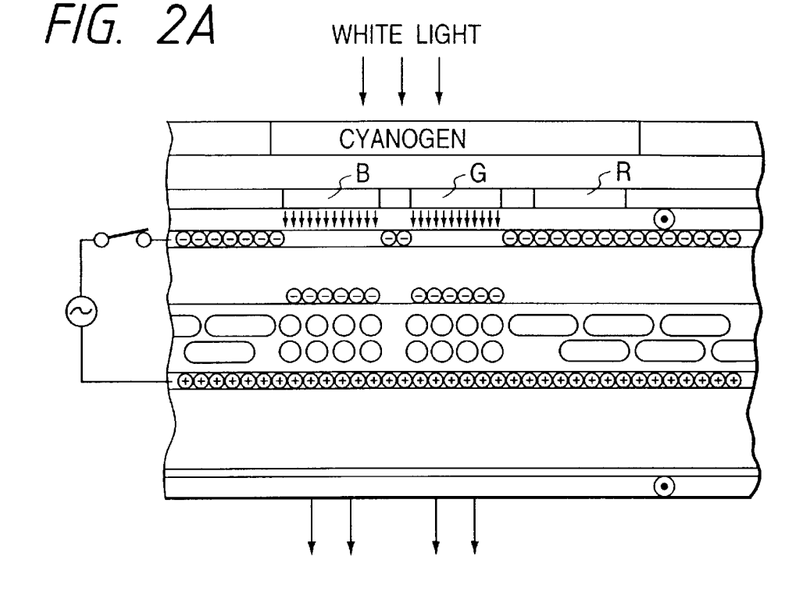
FIGS. 2A and 2B are sectional views showing the SLM element which is applied to the image display apparatus of the present invention to explain a case wherein a positive image is displayed without being inverted.
Figure 2B:
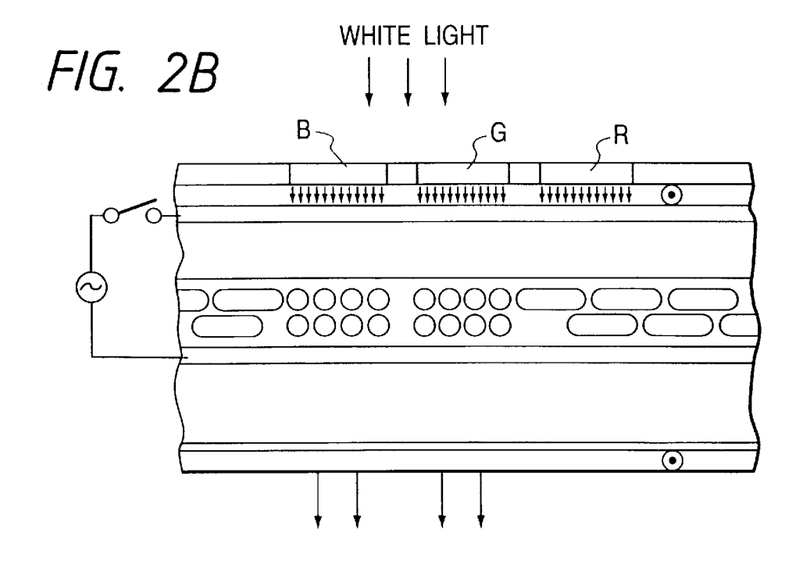
Figure 3A:
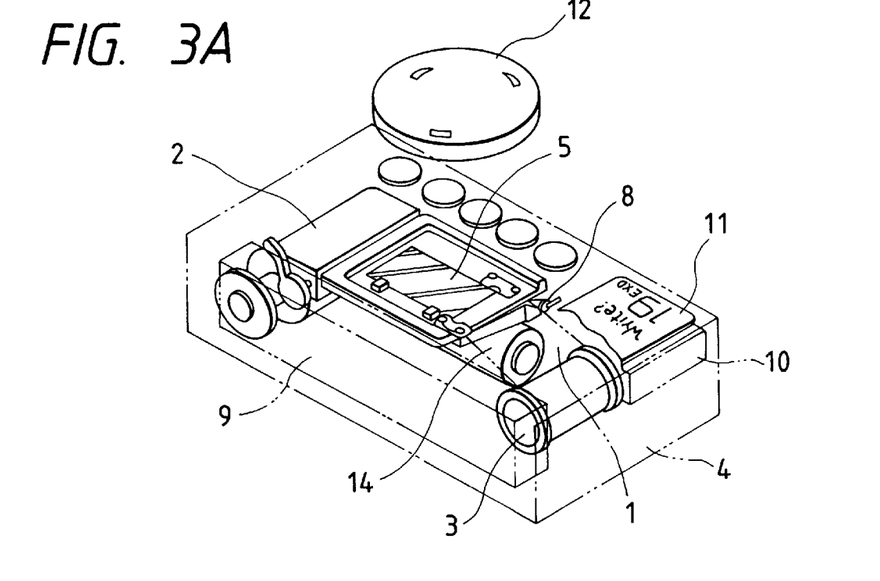
FIGS. 3A and 3B are perspective views showing the arrangement of principal part of the image display apparatus of the present invention.
Figure 3B:
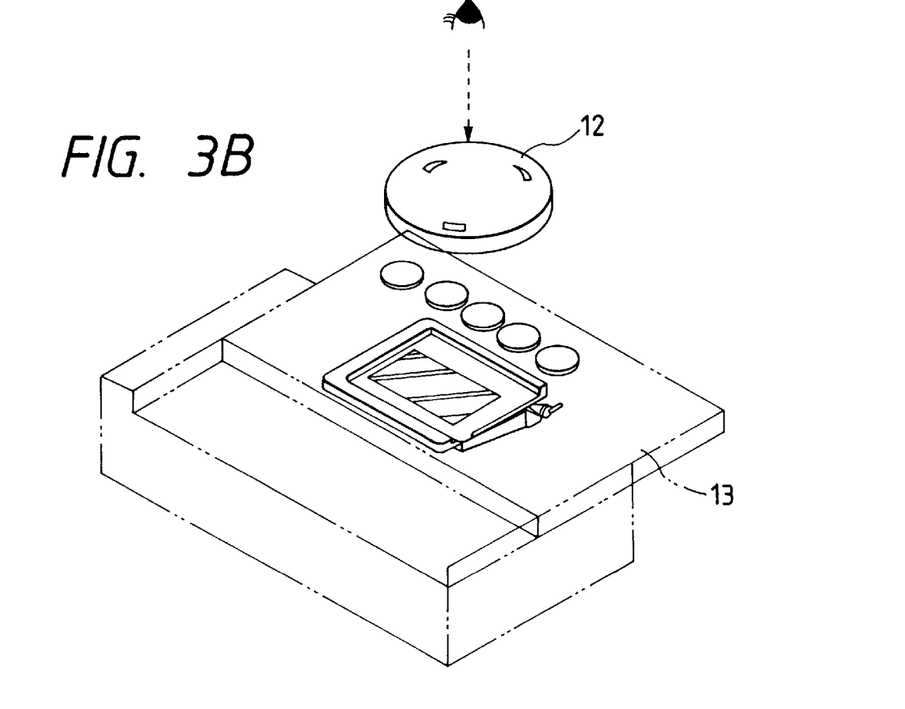

FIGS. 1A and 1B to FIGS. 3A and 3B show the first embodiment of the present invention. FIGS. 1A and 1B and FIGS. 2A and 2B are enlarged sectional views showing the principle for imprinting an image onto a liquid crystal device of the present invention (FIGS. 1A and 2A), and the principle for observing the image (FIGS. 1B and 2B). FIGS. 1A and 1B, and FIGS. 2A and 2B respectively show the state wherein a negative film is set and the state wherein a positive film is set. Also, FIGS. 3A and 3B are perspective views of an example of using a product according to the present invention showing the imprinting state (FIG. 3A) and the observation state (FIG. 3B).

In this embodiment, an APS (Advanced Photo System) film which is a new silver chloride film system will be exemplified below. A silver chloride negative film (positive film in FIG. 2A) 1, which has already been developed, is stored in a film cartridge 2. A known take-up spool 3 automatically takes up the developed film 1 when the film cartridge 2 is set in an apparatus main body, and a designated frame is set to face a liquid crystal unit 5.

The liquid crystal unit 5 will be described in detail below with reference to FIGS. 1A and 1B. In the apparatus of this embodiment, a pure or complementary color filter 5a, preferably a fine one used in an image sensing element (CCD) in a video camera or the like, is used since a silver chloride image can be observed without being impaired. Polarization plates 5b and 5h sandwich a liquid crystal layer (to be described later). In the arrangement shown in FIG. 1A, the direction of polarization of the polarization plate 5b is perpendicular to the sheet of drawing of FIGS. 1A and 1B, and that of the polarization plate 5h is parallel to the sheet of drawing of FIGS. 1A and 1B, thus making up a so-called crossed Nicols structure. Transparent conductive films (to be referred to as ITO layers hereinafter) 5c and 5f normally consist of Indium Tin Oxide or the like, and an AC power supply 6 and a circuit (not shown) for driving it produce potentials of different polarities in these films via a switch (SW) 7. A photo conductive layer 5d is formed with a photodiode layer using an amorphous film. One surface of the photo conductive layer 5d is in tight contact with the above-mentioned ITO layer 5c, and the other surface is in tight contact with a liquid crystal layer 5e. The liquid crystal layer 5e (to be referred to as an FLC hereinafter) can be built by various types of liquid crystal devices. One surface of the FLC 5e is in tight contact with the photo conductive layer 5d, as described above, and the other surface is in tight contact with the above-mentioned ITO layer 5f. The FLC is an abbreviation for a Ferro-electric Liquid Crystal, and an example using such type of liquid crystal among various types of liquid crystal will be exemplified in this embodiment.

A glass plate 5g seals the liquid crystal layer together with another glass plate (not shown) present on the color filter 5a, and also protects the individual layers.

The polarization plate 5h is set in a direction different from that of the above-mentioned polarization plate 5c (more specifically, in the direction of polarization offset by the same angle as the optical rotatory amount produced upon applying an electric field to the FLC 5e). Furthermore, the polarization plate 5h is rotatable about 90° by a known means, and can be switched between the state shown in FIGS. 2A and 2B in which the two polarization plates are in phase, and the state shown in FIGS. 1A and 1B in which the polarization plate 5h is rotated in correspondence with the optical rotatory angle of the FLC 5e.

Referring back to FIGS. 3A and 3B, the image display apparatus of this embodiment comprises a low-profile illuminator 8 which is often used in a flat-panel display, a film feed unit 9 which is suitable for the film system of this embodiment, takes up the film, and detects the frame to be displayed, a driving control circuit 10 suitable for the illuminator 8 and a film take-up device, and a known monitor liquid crystal device 11. A magnifying lens device 12 is located on the side of one polarization plate 5h of the above-mentioned SLM element. In this embodiment, the polarization plate is located on the side of this lens device.

In this arrangement, FIG. 3A shows the state suitable for setting or taking up a film or printing a negative image onto the SLM element (liquid crystal unit) 5, and FIG. 3B shows the state suitable for observing the printed image. In the state shown in FIG. 3B, a display unit 13 including the SLM element 5 is retracted from a main body unit 4 that holds the film feed unit 9, so that the SLM element 5 and the illuminator 8 are retreated from the film 1. Therefore, in the observation state, the film 1 and the SLM element 5 do not overlap each other.

The operation of the above-mentioned arrangement will be explained below. When the user sets a developed film in the apparatus of this embodiment in the state of the apparatus illustrated in FIGS. 1A and 1B, the driving control circuit 10 controls a take-up device to set the first photographed frame to face the surface of the above-mentioned SLM element 5, and waits for a command input by the user.

When the user inputs a command indicating that he or she wants to observe a negative image by operating an operation unit (not shown), the driving control circuit 10 closes the SW 7 to supply an electric field to the SLM element 5, and the ITO layers 5c and 5f are charged by charges of different polarities. In this state, the driving control circuit 10 turns on the illuminator (flat illuminator) 8 to project the image of the negative film 1 onto the SLM element 5.

A case will be exemplified below wherein cyan (the mixed color of blue and green and the complementary color of red) pixels are present. As shown in FIG. 1A, when white light is irradiated onto the negative film, since light which is transmitted through the color filter 5a falls within the range from blue to green, only the blue and green filter portions transmit light, as indicated by fine arrows in FIG. 1A, and the transmitted light enters the photo conductive layer 5d via the ITO layer 5c. Upon incidence of this light, the charges stored in only the irradiated portions of the ITO layer come into direct contact with the FLC, as shown in FIG. 1A. If the photo conductive layer 5d has a thickness of about 2 $\mu$m, and the FLC layer has a thickness of about 1.2 $\mu$m, the liquid crystal changes its optical rotatory power depending on the strength of the applied electric field. Since the strength of the electric field is roughly inversely proportional to the square of distance, the portions below the blue and green filter portions where the photo conductive layer works has an electric field strength about seven times of other portions, and the FLC 5e has the state shown in FIG. 1A in the presence of an electric field having such strength.

In this manner, printing is completed. In this state, the driving control circuit 10 turns off the SW 7, as shown in FIG. 1B. However, since the FLC 5e has a memory effect, the printed image is maintained.

Furthermore, the driving control circuit 10 energizes a motor 14 to move the display unit 13 including the SLM element 5 and the illuminator 8 to a position shown in FIG. 3B, so that it does not overlap the film 1.

In this state, the driving control circuit continuously turns on the illuminator 8 to illuminate the image memorized (printed) on the SLM element 5 from the rear side of the SLM element 5 to present it to the user. This state will be explained below with reference to the principal view of FIG. 1B. As shown in FIG. 1B, when white light is incident from the upper side in FIG. 1B, it directly enters the SLM element 5 without the intermediacy of the negative film 1. Since a normal negative film has a light transmittance as low as about 10%, light about 10 times that upon printing passes through the color filter, and is separated into the individual colors, which then enter the photo conductive layer via the polarization plate and the ITO layer. In this case, all the portions of the photo conductive layer 5d are conducted, but no electric field is applied to the FLC since the SW 7 is OFF. Accordingly, the light coming from the illuminator reaches the user's eyes as backlight illumination of the FLC 5e.

At this time, since the polarization plates 5b and 5h make up a crossed Nicols structure, the light components that pass through liquid crystal portions which have been inverted (indicated by open circles in FIG. 1B) upon application of the electric are cut by the polarization plate 5h, and the light components that pass through only the portions which are not inverted (indicated by open ellipses in FIG. 1B) upon printing the negative image reach the user's eyes. Accordingly, a cyan pixel on the negative film is observed as a red pixel by the user's eyes, thus realizing negative-positive inversion of the color film.

Thereafter, when the user inputs a command for observing another frame using the operation unit (not shown), the driving control circuit 10 turns on the SW 7, applies charges to be supplied from the power supply 6 in a direction opposite to that shown in FIG. 1A, and instantaneously turns on the illuminator 8. In this state, the photo conductive layer is flatly illuminated without any image, an opposite electric field is uniformly produced in the entire FLC, and all the FLC pixels are set in the open ellipse state shown in FIG. 1A (at this time, the user observes the uniformly white SLM element). Thereafter, the driving control circuit 10 controls the motor 14 to restore the SLM element 5, the illuminator 8, and the magnifying lens device 12 to the state shown in FIG. 3A, and controls the film feed unit 9 by a known means to bring another frame designated by the user to the portion of the SLM element 5. Thereafter, negative-positive inversion display of the new frame is done by the same operations as described above.

In this manner, after a negative image is instantaneously printed, the SW 7 is disconnected from the power supply so as not to apply an electric field to the FLC for a long period of time, and the FLC is reset at the end of the operation for each frame. Accordingly, inversion of only a specific pixel by the electric field for a long period of time can be prevented and, hence, the structure of the composition itself can be prevented from suffering nonuniformity.

FIGS. 2A and 2B are views for explaining the state wherein a developed positive film is set in the above-mentioned viewer (originally, a person's face or the like on a positive film can be sufficiently recognized even when it is observed by the naked eye, but FIGS. 2A and 2B assume a case wherein the film take-up device or magnifying lens alone is to be used). Most operations are the same as those upon observing the negative film. In this case, the polarization plate 5h attached to the magnifying lens device 12 is rotated to the position for a positive film, and is set in the same direction as that of the polarization plate 5b on the entrance side of white light, as shown in FIGS. 2A and 2B. With this setting, the above-mentioned negative-positive inversion is not performed, and the color tones of the printed image directly reach the user's eyes.

Figure 4A:
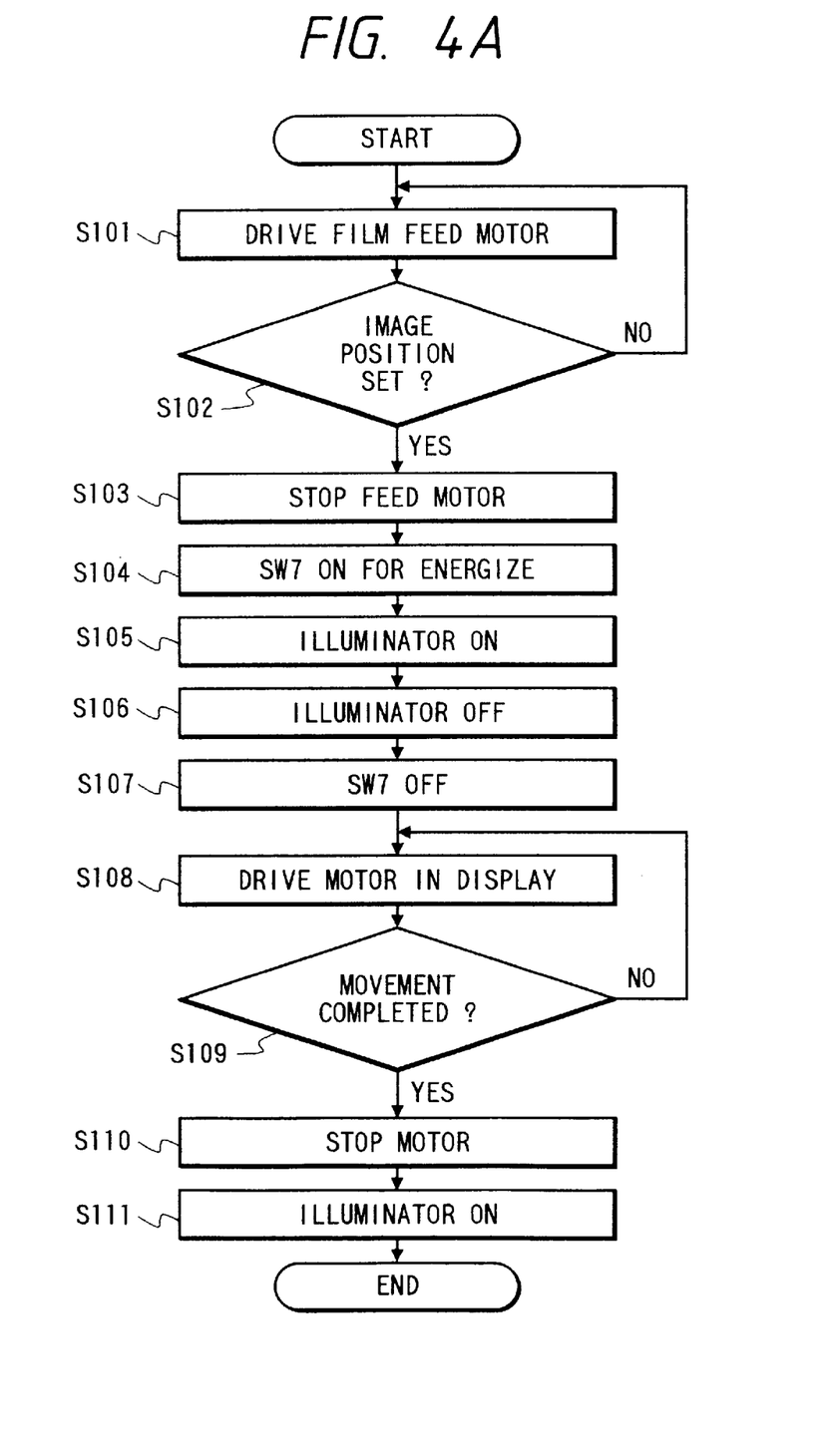
FIGS. 4A and 4B are operation flow charts in an image display apparatus according to the first embodiment of the present invention.

FIG. 4A is a flow chart showing the flow until a negative-positive inverted image is allowed to be observed in the viewer of this embodiment.

Note that each step will be abbreviated as S hereinafter. A film feed motor is driven to feed a film in accordance with a user's operation (S101). It is checked if a negative image is set at a predetermined position (S102). If Y (YES) in S102, the feed motor is stopped (S103). Subsequently, the switch 7 is turned on to energize the ITO layer, thereby applying an electric field to the SLM element (S104). Thereafter, the illuminator is turned on (S105). After printing of the negative image is complete, the illuminator is turned off (S106), and subsequently, the ITO layer is deenergized (S107).

A motor for moving the display unit is driven (S108). It is then checked if the display unit has moved to a predetermined position (S109). If Y (YES) in S109, the motor is stopped (S110). The illuminator is turned on to be used as a backlight, thereby displaying an image by inverting the negative image to a positive image (S111).

Figure 4B:
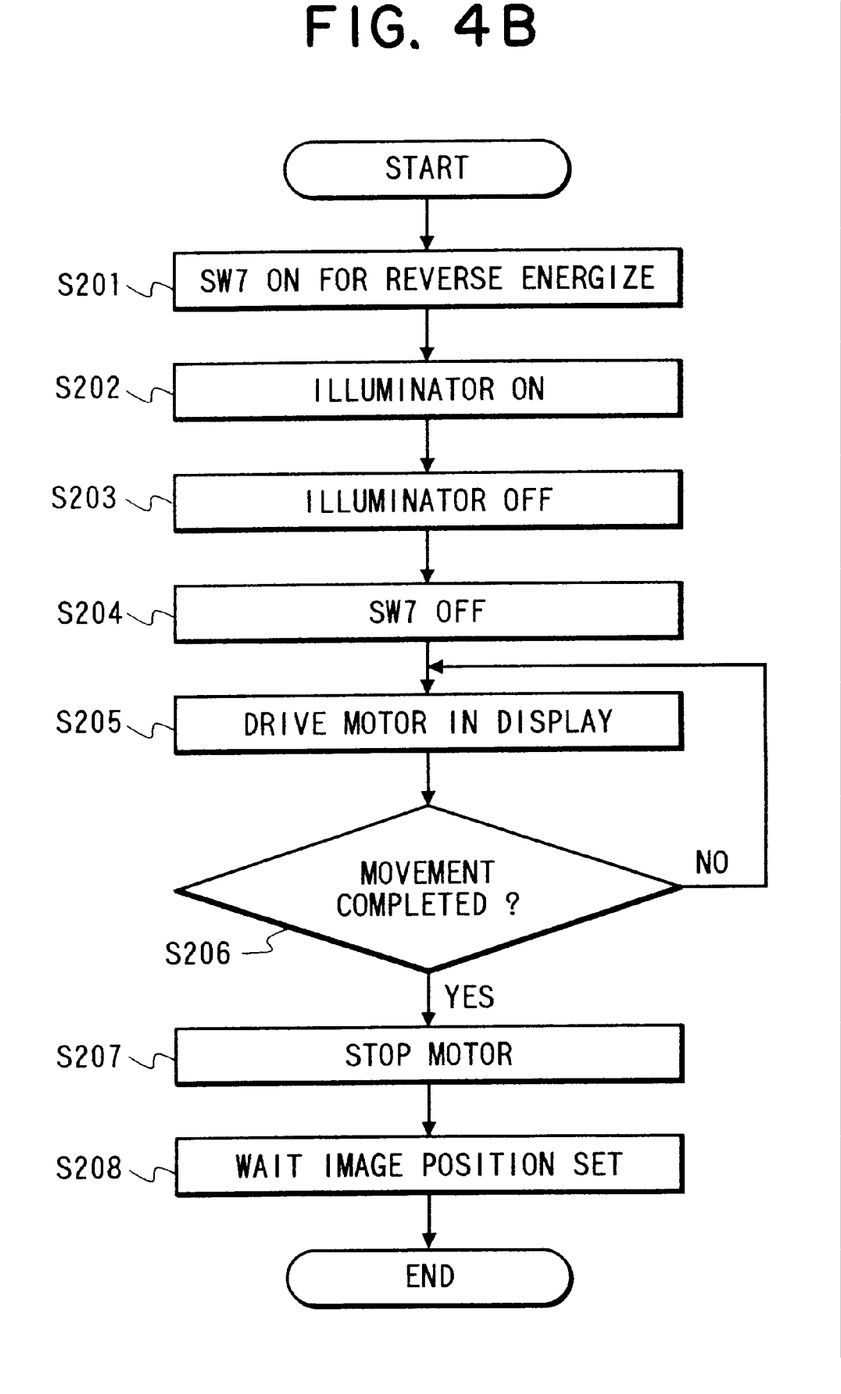

FIG. 4B is a flow chart showing the flow upon deleting the displayed negative-positive inverted image. The ITO layer is inversely energized to apply an electric field to the SLM element in accordance with a user's operation (S201). The illuminator is turned on to produce a uniform reverse electric field in the entire FLC, thereby resetting an image (S202).

After an elapse of a predetermined period of time, the illuminator is turned off (S203), and the ITO layer is then deenergized (S204). Thereafter, the motor for moving the display unit is driven (S205), and it is then checked if the display unit has returned to the original position (S206). If Y (YES) in S206, the motor is stopped (S207). Then, the film feed waiting state is set to prepare for observation of a new frame (S208).

Figure 5A:
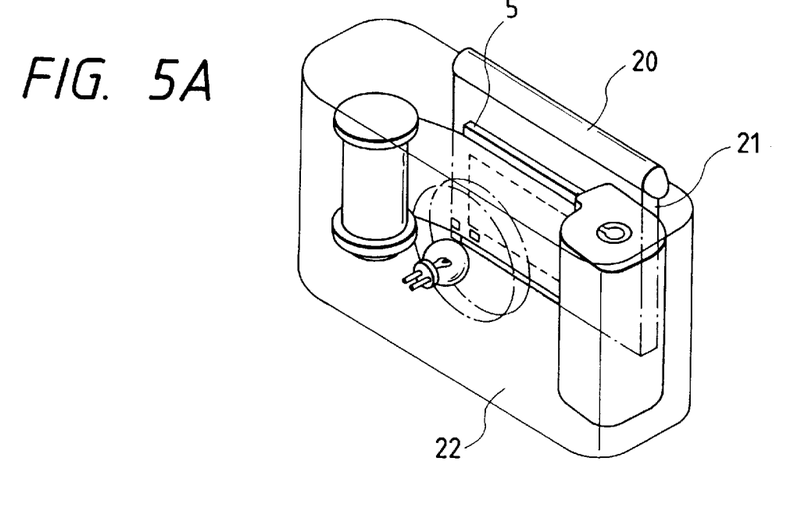
FIGS. 5A and 5B are perspective views showing the arrangement of principal part of an image display apparatus according to the second embodiment of the present invention.
Figure 5B:
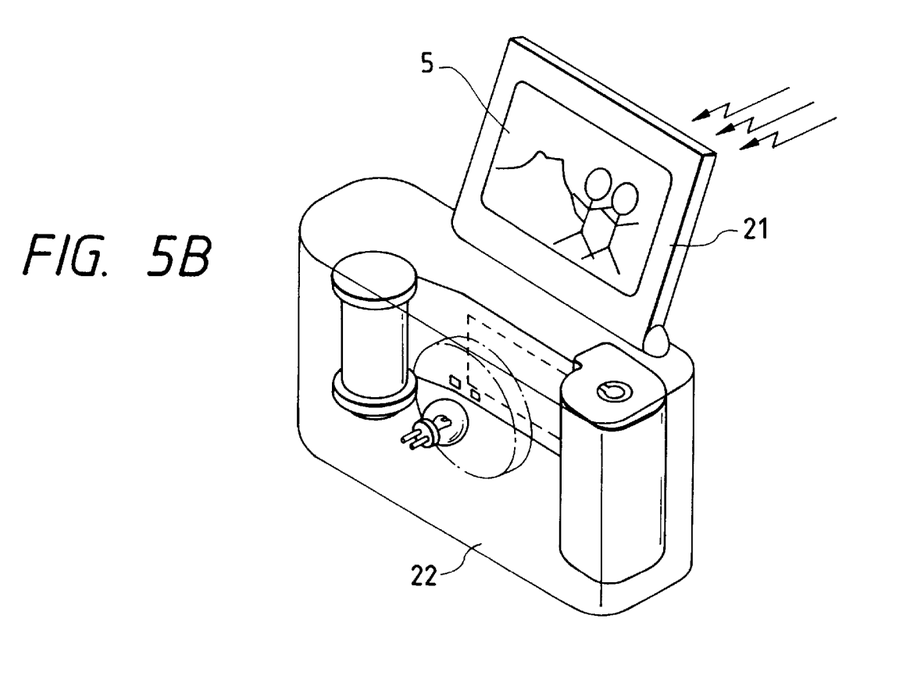

FIGS. 5A and 5B are perspective views showing the second embodiment of an image display apparatus according to the present invention. In the first embodiment, as shown in FIG. 3B, the SLM element 5 on which an image is printed, and the illuminator 8 are slid together in a direction parallel to the film surface to set an observation state, and an image is displayed using the illuminator 8 as a backlight.

In the second embodiment, a display unit 21 having the SLM element 5, on which an image is printed, pivots about a hinge 20 to be opened from a main body unit 22 comprising a film feed unit and an illuminator. FIG. 5A shows the state wherein a film image is imprinted on an FLC. In this state, the display unit 21 is closed with respect to the main body unit 22. FIG. 5B shows the state wherein the image memorized on the FLC is observed. In this state, the display unit 21 is opened with respect to the main body unit 22, and displays the image using external light as a backlight. Hence, a light source for printing is different from that for observation. In this case, laser light or flash light may be used as a light source for printing.

The third embodiment that presents a negative-positive inversion method different from the above-mentioned method will be explained below.

The first embodiment switches between the display state of a negative image by inverting it into a positive image, and the display state of a positive image without inverting it, by rotating the polarization plate 5h. In the third embodiment, the polarization plate 5h is not rotated, and opposing electric fields are applied to an SLM in correspondence with a case wherein a negative image is displayed by inverting it to a positive image and a case wherein a positive image is displayed without being inverted. Therefore, the polarization plate 5h is fixed to maintain the state shown in FIGS. 1A and 1B, and the viewer switches the energization direction of the SLM by automatically discriminating whether the fed film is a negative or positive film.

Although a description is omitted in the first embodiment, the perforations formed on the film are detected using a known combination of a light-emitting element and light-receiving element to determine the stop position of the film, so as to set the image position on the film at a predetermined position (to stop the film so that the image center matches the center of the magnifying lens device 12). It is discriminated based on the output value of this light-receiving element whether the fed film is a negative or positive film. That is, a portion outside the photographing frame of a positive film is solid black, and a portion outside the photographing frame of a negative film is transparent orange. For this reason, the negative film yields a larger output value of the light-receiving element than the positive film, i.e., they yield clearly different output values. Whether or not the fed film is a negative or positive film is discriminated during feeding the film to set the first frame after the film cartridge is loaded, thus determining the energization direction of the SLM element.

Figures 6, 6A:
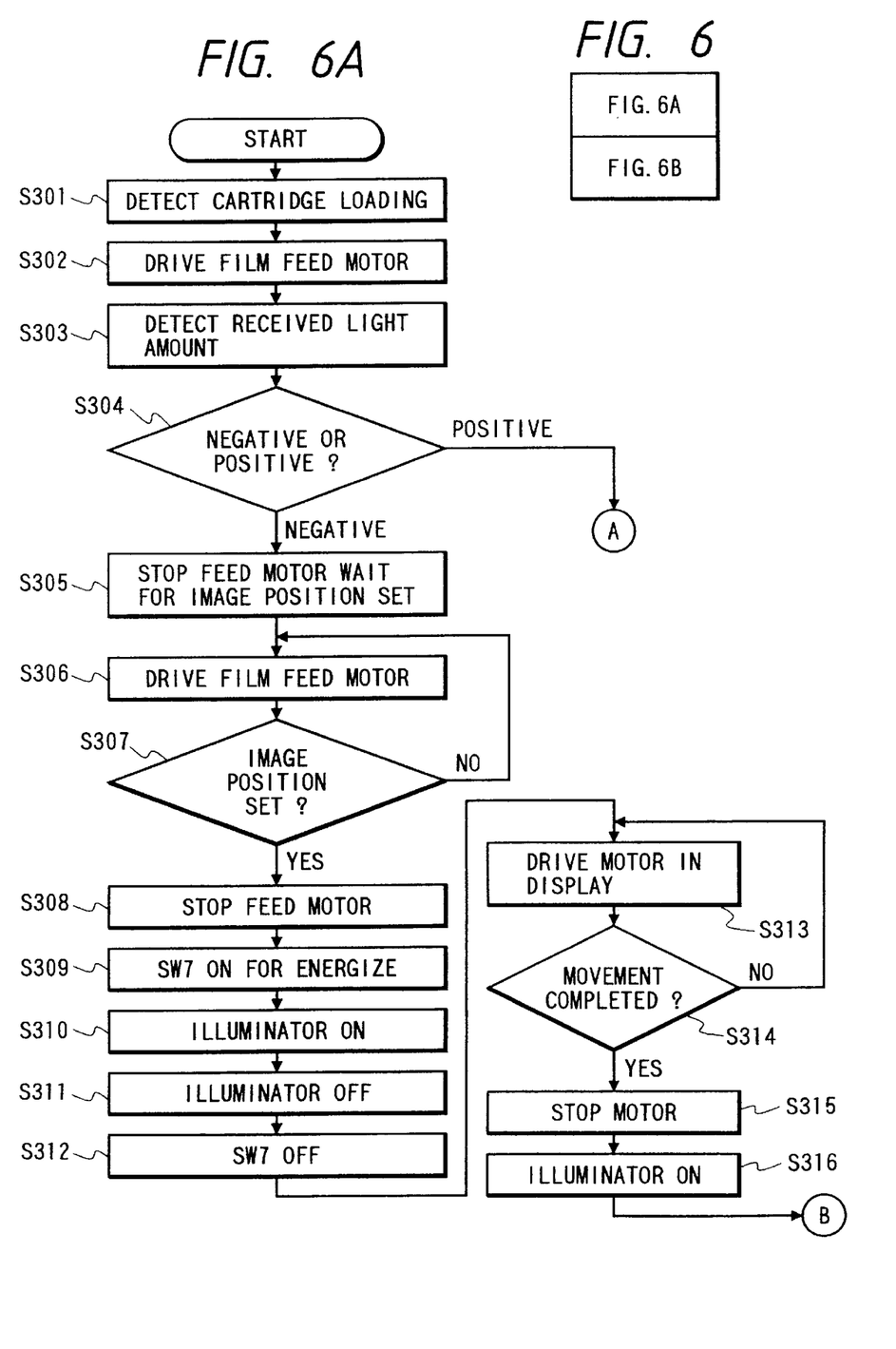
Figure 6B:
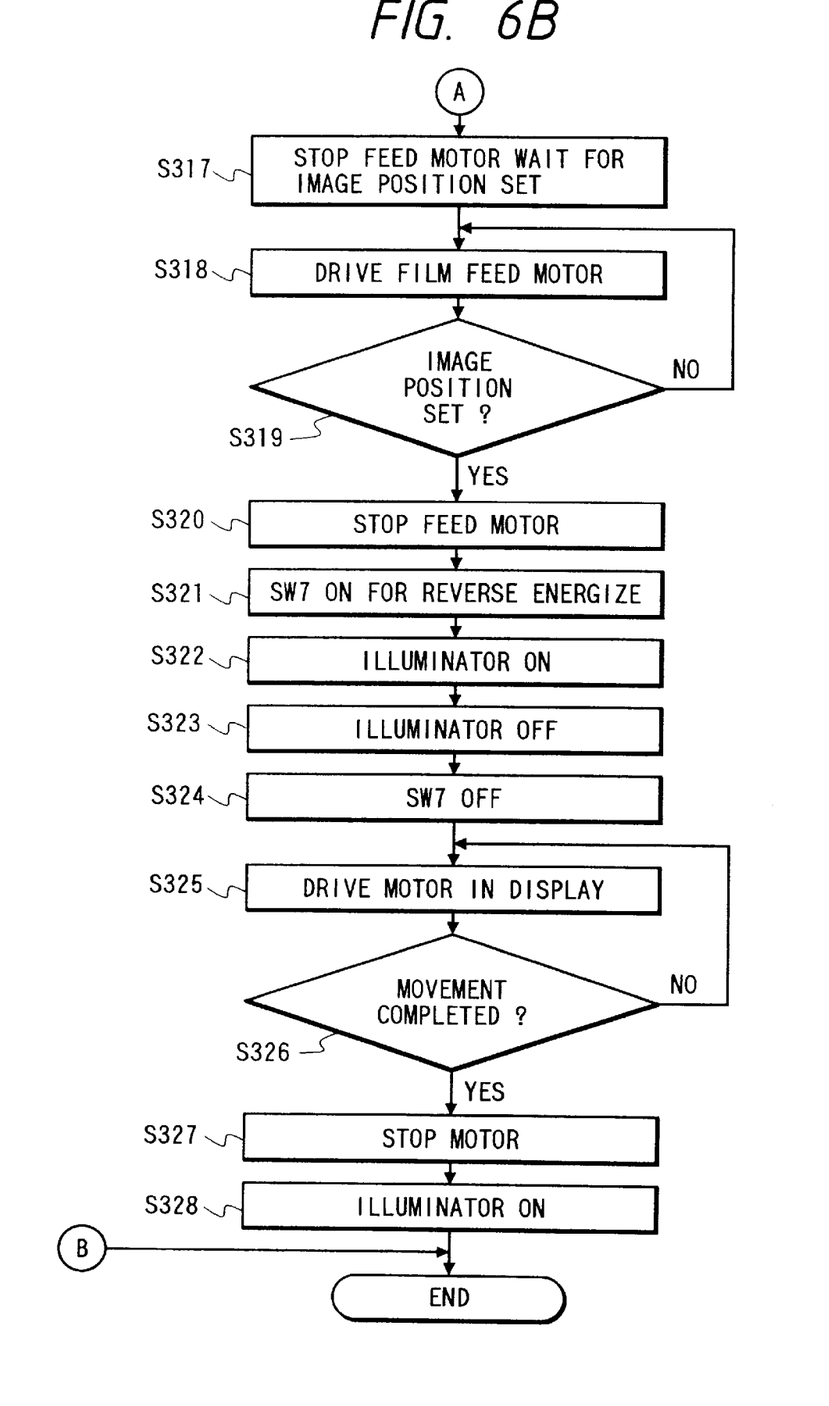

FIGS. 6A and 6B are flow charts showing the flow until a negative image is inverted to a positive image and an image is allowed to be observed in the viewer of the third embodiment. It is detected that the user has loaded the film cartridge (S301), and the film feed motor is driven (S302). During film feeding immediately after loading, the received light amount of the light-receiving element is detected (S303) to check, based on the output value, if the fed film is a negative or positive film (S304). If it is determined that the fed film is a negative film, the flow advances to S305 to S316; otherwise, the flow advances to S317 to S328.

A detailed description will be omitted since the contents of S306 to S316 and S318 to S328 are the same as those of S101 to S111 in FIG. 4A in the first embodiment. However, it should be noted that the energization direction of the ITO layer in S309 is opposite to that in S321.

In order to delete the displayed image, an electric field is applied (the ITO layer is reversely energized) in a direction opposite to that (agreeing with the energization direction of the ITO layer) of the electric field applied to the SLM element upon printing, thereby resetting the image.

In the above embodiments, only an image defined by light input from a negative or positive image on a film has been described. Also, the image display apparatus of the present invention can be applied to images input from other optical images.

What is claimed is:

1. An image display apparatus for displaying an image recorded on a film, comprising:
   a) a spatial light modulation device which can maintain a recorded image in a non-energization state;
   b) an illumination device for illuminating said spatial light modulation device with light;
   c) a moving mechanism for moving said spatial light modulation device and said illumination device to one of a first state in which said film is located between said spatial light modulation device and said illumination device and a second state in which said film is not located between said spatial light modulation device and said illumination device; and
   d) a control circuit for moving said spatial light modulation device and said illumination device to said first state when an image recorded on said film is to be recorded on said spatial light modulation device, and moving said spatial light modulation device and said illumination device to said second state when said spatial light modulation device on which the image is recorded is to be observed.

2. An apparatus according to claim 1, wherein said illumination device illuminates said spatial light modulation device with light for a predetermined period of time when the image recorded on said film is to be recorded on said spatial light modulation device, and continuously illuminates said spatial light modulation device with light when said spatial light modulation device on which the image is recorded is to be observed.

3. An apparatus according to claim 1, wherein said spatial light modulation device is energized when the image recorded on said film is to be recorded on said spatial light modulation device and when the image recorded on said spatial light modulation device is erased.

4. An apparatus according to claim 1, wherein said spatial light modulation device is built by stacking a color filter, a first polarization plate, a photo conductive layer, a liquid crystal layer, and a second polarization plate.

5. An apparatus according to claim 4, wherein said liquid crystal layer consists of a ferro-electric liquid crystal.

6. An image display apparatus for displaying an image recorded on a film, comprising:
   a) a spatial light modulation device which can maintain a recorded image in a non-energization state;
   b) an illumination device for illuminating said spatial light modulation device with light;
   d) a switching mechanism for switching between a first state in which said film is located between said spatial light modulation device and said illumination device and a second state in which said film is not located between said spatial light modulation device and said illumination device; and
   e) a control circuit for activating said spatial light modulation device and said illumination device in said first state when an image recorded on said film is to be recorded on said spatial light modulation device, and activating said illumination device in said second state when said spatial light modulation device on which the image is recorded is to be observed.

7. An apparatus according to claim 6, wherein said control circuit deletes the image recorded on said spatial light modulation device by activating said spatial light modulation device and said illumination device in said second state.

8. An apparatus according to claim 7, wherein said control circuit reverses an energization direction of said spatial light modulation device between a case wherein the image recorded on said film is to be recorded on said spatial light modulation device, and a case wherein the image recorded on said spatial light modulation device is to be deleted.

9. An apparatus according to claim 6, wherein said spatial light modulation device is built by stacking a color filter, a first polarization plate, a photo conductive layer, a liquid crystal layer, and a second polarization plate.

10. An apparatus according to claim 9, wherein said liquid crystal layer consists of a ferro-electric liquid crystal.

11. An image display apparatus for displaying an image recorded on a film, comprising:
    a) a spatial light modulation device which can maintain a recorded image in a non-energization state;
    b) an illumination device for illuminating said spatial light modulation device with light;
    d) a switching mechanism for switching between a first state in which said film is located between said spatial light modulation device and said illumination device and a second state in which said film is not located between said spatial light modulation device and said illumination device; and
    e) a control circuit for recording the image recorded on said film on said spatial light modulation device by activating said spatial light modulation device and said illumination device in said first state, and deleting the image recorded on said spatial light modulation device by activating said spatial light modulation device and said illumination device in said second state.

12. An apparatus according to claim 11, wherein said control circuit reverses an energization direction of said spatial light modulation device between a case wherein the image recorded on said film is to be recorded on said spatial light modulation device, and a case wherein the image recorded on said spatial light modulation device is to be deleted.

13. An apparatus according to claim 11, wherein said spatial light modulation device is built by stacking a color filter, a first polarization plate, a photo conductive layer, a liquid crystal layer, and a second polarization plate.

14. An apparatus according to claim 13, wherein said liquid crystal layer consists of a ferro-electric liquid crystal.

15. An image display apparatus for displaying an image recorded on a film, comprising:
    a) a spatial light modulation device which has a liquid crystal layer sandwiched between two polarization plates, and can maintain a recorded image in a non-energization state;

b) an illumination device for illuminating said spatial light modulation device with light;

c) a discrimination circuit for discriminating if said film is a negative or positive film; and d) means for inverting only an image recorded on said negative film by changing a direction of polarization of one of said two polarization plates in correspondence with an output from said discrimination circuit.

16. An apparatus according to claim 15, wherein said liquid crystal layer consists of a ferro-electric liquid crystal.

17. An image display apparatus for displaying an image recorded on a film, comprising:

a) a spatial light modulation device which has a liquid crystal layer sandwiched between two transparent conductors, and can maintain a recorded image in a non-energization state;

b) an illumination device for illuminating said spatial light modulation device with light;

c) a discrimination circuit for discriminating if said film is a negative or positive film; and d) means for inverting only an image recorded on said negative film by changing an energization direction of one of said two transparent conductors in correspondence with an output from said discrimination circuit.

18. An apparatus according to claim 17, wherein said liquid crystal layer consists of a ferro-electric liquid crystal.

19. An image display apparatus for recording an image recorded on a film onto a spatial light modulation device by irradiating light onto said spatial light modulation device via said film, and observing said spatial light modulation device on which the image is recorded, characterized by comprising:

an illumination device for illuminating with light said spatial light modulation device on which the image recorded on said film, is recorded, and in that said illumination device illuminates said spatial light modulation device with light in the same illumination direction as an illumination direction of light upon recording the image recorded on said film onto said spatial light modulation device.

20. An apparatus according to claim 19, wherein said spatial light modulation device is energized when the image recorded on said film is recorded onto said spatial light modulation device and when the image recorded on said spatial light modulation device is erased.

21. An apparatus according to claim 19, wherein said spatial light modulation device is built by stacking a color filter, a first polarization plate, a photo conductive layer, a liquid crystal layer, and a second polarization plate.

22. An apparatus according to claim 21, wherein said liquid crystal layer consists of a ferro-electric liquid crystal.

23. An image display device, wherein:

an image on a film is recorded onto a spatial light modulation device, said spatial light modulation device is illuminated for an inspection of the image, an illumination device is provided to illuminate said spatial light modulation device through said film to record the image on said film onto said spatial light modulation device, and said illumination device illuminates said spatial light modulation device through said film with a light projected in a direction same as a light used when said spatial light modulation device is illuminated for the inspection of the image.

24. An image display device according to claim 23, wherein said spatial light modulation device is energized when the image on said film is recorded onto said spatial light modulation device and when the image recorded onto said spatial light modulation device is erased.

25. An apparatus according to claim 23, wherein said spatial light modulation device is built by stacking a color filter, a first polarization plate, a photo conductive layer, a liquid crystal layer, and a second polarization plate.

26. An apparatus according to claim 25, wherein said liquid crystal layer consists of a ferro-electric liquid crystal.

* * * * *